US006971225B1

(12) United States Patent  
Kempf et al.

(10) Patent No.: US 6,971,225 B1  
(45) Date of Patent: Dec. 6, 2005

(54) CONTROL ARRANGEMENT FOR A PULL-TYPE WINDROW MERGER

(75) Inventors: Russell J. Kempf, Kewaskum, WI (US); Damion D. Babler, Albany, WI (US); George B. Cicci, Fitchburg, WI (US)

(73) Assignee: Gehl Company, West Bend, WI (US)

( * ) Notice: Subject to any disclaimer, the term of this patent is extended or adjusted under 35 U.S.C. 154(b) by 0 days.

(21) Appl. No.: 10/721,554

(22) Filed: Nov. 25, 2003

(51) Int. Cl.[7] .................. A01D 76/00; A01D 78/00; A01D 80/00; A01D 84/00
(52) U.S. Cl. .................................................. 56/398
(58) Field of Search ............... 56/398, 15.1, 13.5, 56/192, DIG. 5, DIG. 21, 366, 370, 345, 56/354

(56) References Cited

U.S. PATENT DOCUMENTS

| | | | | |
|---|---|---|---|---|
| 2,761,270 A | * | 9/1956 | Blaser et al. ................. 56/370 |
| 4,304,086 A | * | 12/1981 | Stuchl ............................ 56/6 |
| 4,910,951 A | * | 3/1990 | Reilly et al. .................. 56/376 |
| 4,979,359 A | * | 12/1990 | Inskeep ...................... 56/14.9 |
| 5,203,154 A | * | 4/1993 | Lesher et al. ................. 56/366 |
| 5,231,826 A | * | 8/1993 | Jennings ...................... 56/11.4 |
| 5,301,496 A | * | 4/1994 | Sudbrack et al. ............. 56/366 |
| 5,471,825 A | * | 12/1995 | Panoushek et al. ......... 56/10.2 E |
| 5,544,475 A | * | 8/1996 | Skibo ........................... 56/15.5 |
| 5,566,535 A | * | 10/1996 | Pruitt ........................... 56/15.1 |
| 5,713,192 A | * | 2/1998 | Robinson ...................... 56/13.5 |
| 5,765,650 A | * | 6/1998 | Checkel ........................ 172/681 |
| 6,068,063 A | * | 5/2000 | Mayerle et al. .............. 172/315 |
| 6,205,757 B1 | * | 3/2001 | Dow et al. .................... 56/366 |
| 6,212,865 B1 | * | 4/2001 | Peeters et al. ................ 56/366 |
| 2004/0200203 A1 | * | 10/2004 | Dow et al. .................... 56/375 |

* cited by examiner

Primary Examiner—Árpád Fábián Kovács
(74) Attorney, Agent, or Firm—Boyle, Fredrickson, Newholm, Stein & Gratz, S.C.

(57) ABSTRACT

A control arrangement is configured to remotely control operation of a windrow merger pulled by a tow vehicle. The windrow merger includes a plurality of functional systems or assemblies configured to selectively collect and discharge crop material, and that can be adjusted to alter the operating characteristics or parameters of the windrow merger. The control arrangement includes a controller, a housing, and a harness configured to communicate control signals from the controller to the number of functional assemblies. The control arrangement further includes a manifold assembly configured to the control signals from the controller to respective control valves operable to control operation of the number of functional assemblies. Thereby, the controller allows the operator to regulate operation and activation of each of the number of functional assemblies from the operator's cab of the tow vehicle.

17 Claims, 12 Drawing Sheets

CONTROL ARRANGEMENT FOR A PULL-TYPE WINDROW MERGER

BACKGROUND AND SUMMARY OF THE INVENTION

This invention relates to windrow merger, and more particularly to a controller for a windrow merger configured to enhance control of the merger from a remote location relative to the merger.

A windrow merger is commonly used in the agricultural field for combining windrows, or rows, of crops in the field. Typically, the windrow merger is portable and is pulled along by a towing vehicle such as a tractor or other motorized vehicle. The towing vehicle will typically make several passes with the windrow merger, combining windrows with each pass. Later, a forage harvester or baler harvests the combined windrows. By combining the windrows, the merger makes each pass with a forage harvester or baler more productive. The merger also operates to turn over the windrows, enhancing drying and conditioning of the crops. Use of a merger also reduces fuel costs, man-hours, and wear and tear on the harvester or baler equipment.

Known windrow mergers have several drawbacks. For example, known mergers typically include one more individual control switches positioned on the merger for controlling the various functional systems or assemblies incorporated in the merger, e.g. the mechanical and/or hydraulic systems of the merger. This characteristic of known mergers makes the merger cumbersome to adjust, because an operator must leave the towing vehicle to adjust operation of the one or more functional systems or assemblies of the merger. Other known mergers are configured to connect one or more tractor hydraulic controls with the multiple functional systems or assemblies of the merger. This type of control is often complicated for the operator in determining the manner in which adjustment of a particular tractor control affects the operation of the respective functional system or assembly of the merger. Furthermore, this known type of control creates confusion as to which lever of the tractor hydraulic system is used to operate the function that the operator desires to perform. Therefore, there is a need for a simplified controller for a windrow merger that is less cumbersome for tractor operators to use.

It is an object of the present invention to provide a controller for a windrow merger, which is configured to directly correlate switches of the controller with respective mechanical and/or hydraulic systems or assemblies of the merger. It is a further object of the invention to provide such a controller that can be located remotely from the windrow merger, such as in the cab of a tow vehicle such as a tractor.

The present invention contemplates a control arrangement for a pull-type windrow merger having a number of functional systems or assemblies that cooperate and interact to collect and discharge a windrow of crop material. Each of the functional systems or assemblies includes an electrically operated actuator that controls an operating characteristic or parameter of the system or assembly. The control arrangement includes a controller, a housing that supports the controller, a harness arrangement having a first connector electrically connected to the controller, a second connector electrically connected to a power supply, and a third connector electrically connected to the number of electrically operated actuators of the functional systems or assemblies of the merger. The harness arrangement may also include provisions for connection to optional systems or assemblies that may be incorporated in the windrow merger. The controller is configured to regulate activation of each of the number of electrically operated actuators from a remote location relative to the pull-type merger.

The invention further contemplates a windrow merger having a control arrangement and a method of controlling the operational parameters or characteristics of a windrow merger, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
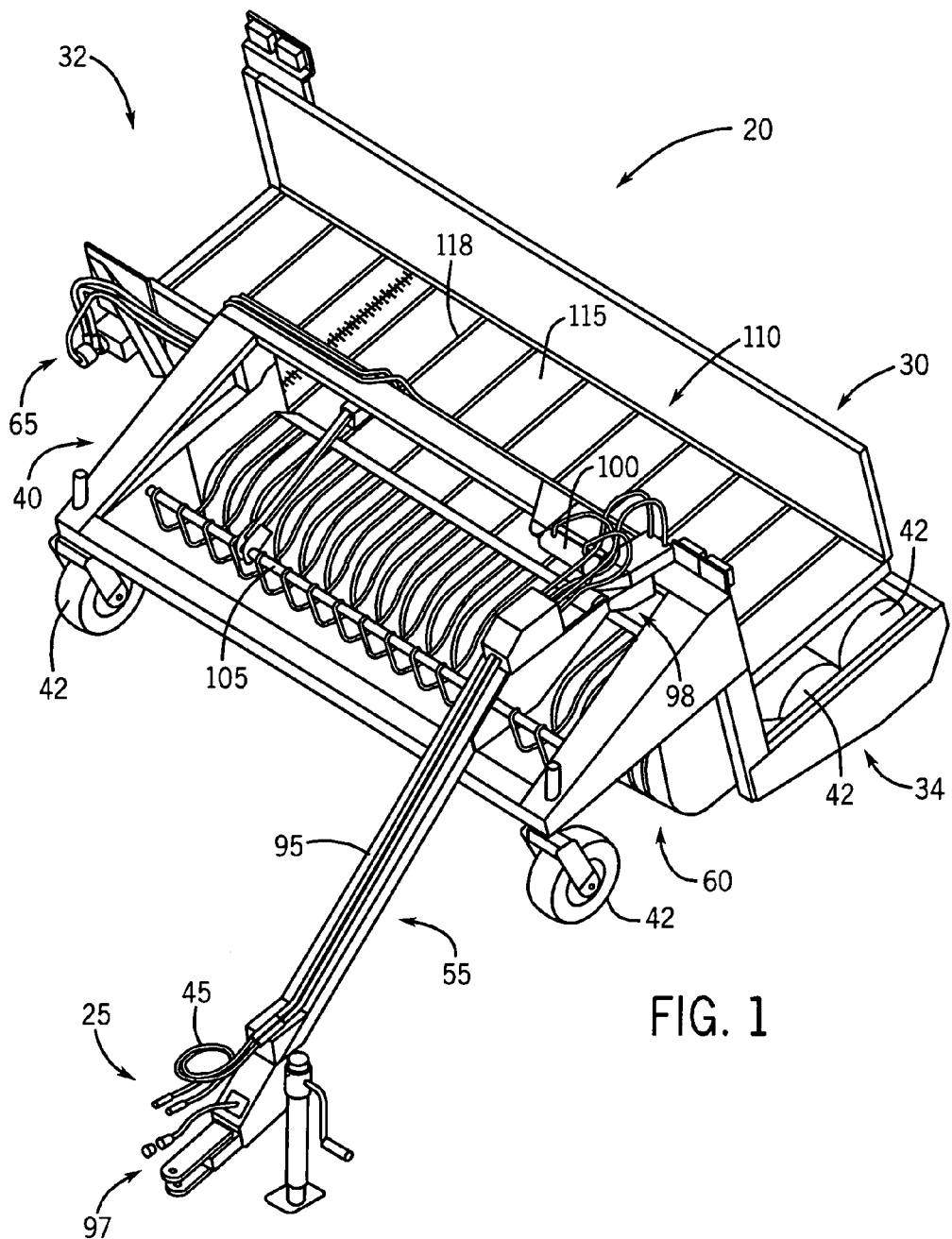
FIG. 1 is an isometric view of a windrow merger incorporating the control arrangement of the present invention.

FIG. 1 shows a pull-type windrow merger 20 constructed according to the invention. Windrow merger 20 is configured to be coupled and pulled by a tow vehicle, e.g., a tractor or other vehicle (not shown), in a manner as is known. The windrow merger 20 includes a front portion 25, a rear portion 30, and a first side portion 32 and a second side portion 34. The windrow merger 20 includes a frame assembly 40 having a series of laterally spaced ground-engaging wheels 42 configured to support the windrow merger 20. The type and number of wheels 42 can vary. The preferred tow vehicle includes a hydraulic power assembly connected by hydraulic supply lines 45 to the windrow merger 20. The hydraulic power assembly is configured to provide hydraulic output to drive operation of the various components of windrow merger 20, which will later be explained.

Figure 2:
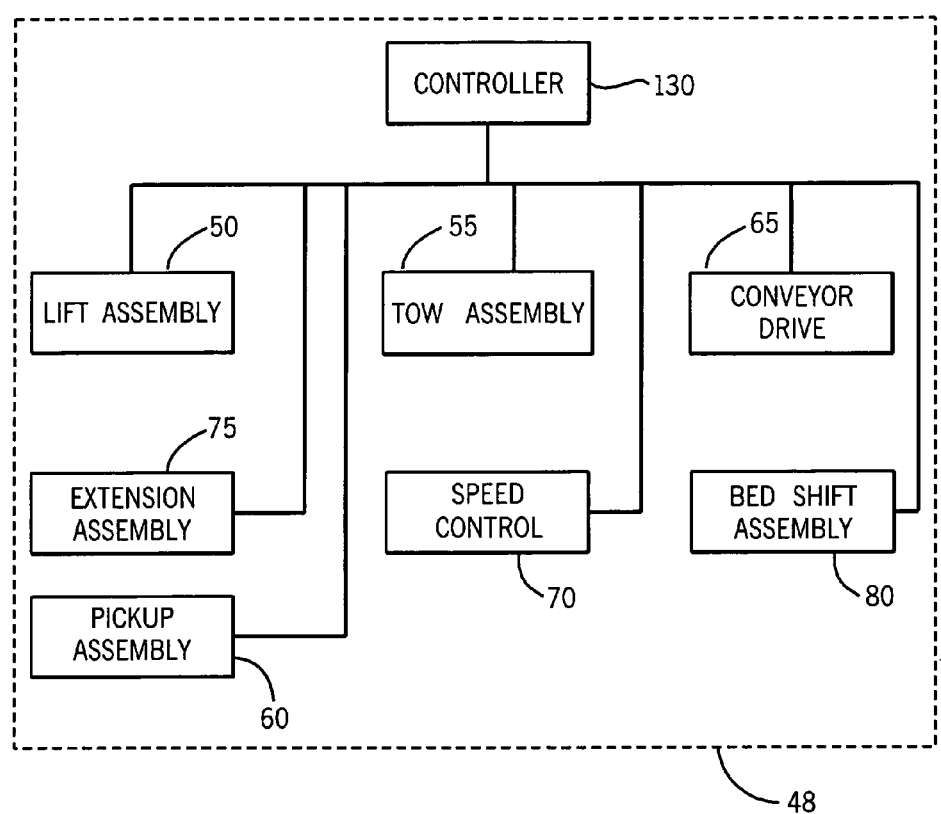
FIG. 2 is a schematic view of a controller forming a part of the control arrangement of the present invention, and interconnection of the controller with the functional systems and assemblies of the windrow merger as shown in FIG. 1.

Referring to FIGS. 1 and 2, the windrow merger 20 generally includes a control arrangement 48 configured to control operation and/or characteristics of a series of functional systems or assemblies incorporated into windrow merger 20, for merging windrows of crop material on the ground in accordance with selected operating characteristics or parameters of the functional systems or assemblies of windrow merger 20. In the illustrated embodiment, the functional systems or assemblies incorporated in windrow merger 20 include a lift assembly 50, a tow assembly 55, a pickup assembly 60, a conveyor drive assembly 65, a conveyor speed control assembly 70, an extension conveyor assembly 75, and a bed shift assembly 80. Control arrangement 48 includes a controller 130 that is interconnected with, and is configured to control, the functional systems or assemblies of the windrow merger 20. The windrow merger 20 can include various combinations of one or more of the number of functional systems or assemblies described above, as well as other known functional systems or assemblies that can be incorporated in the windrow merger 20.

Figure 7:
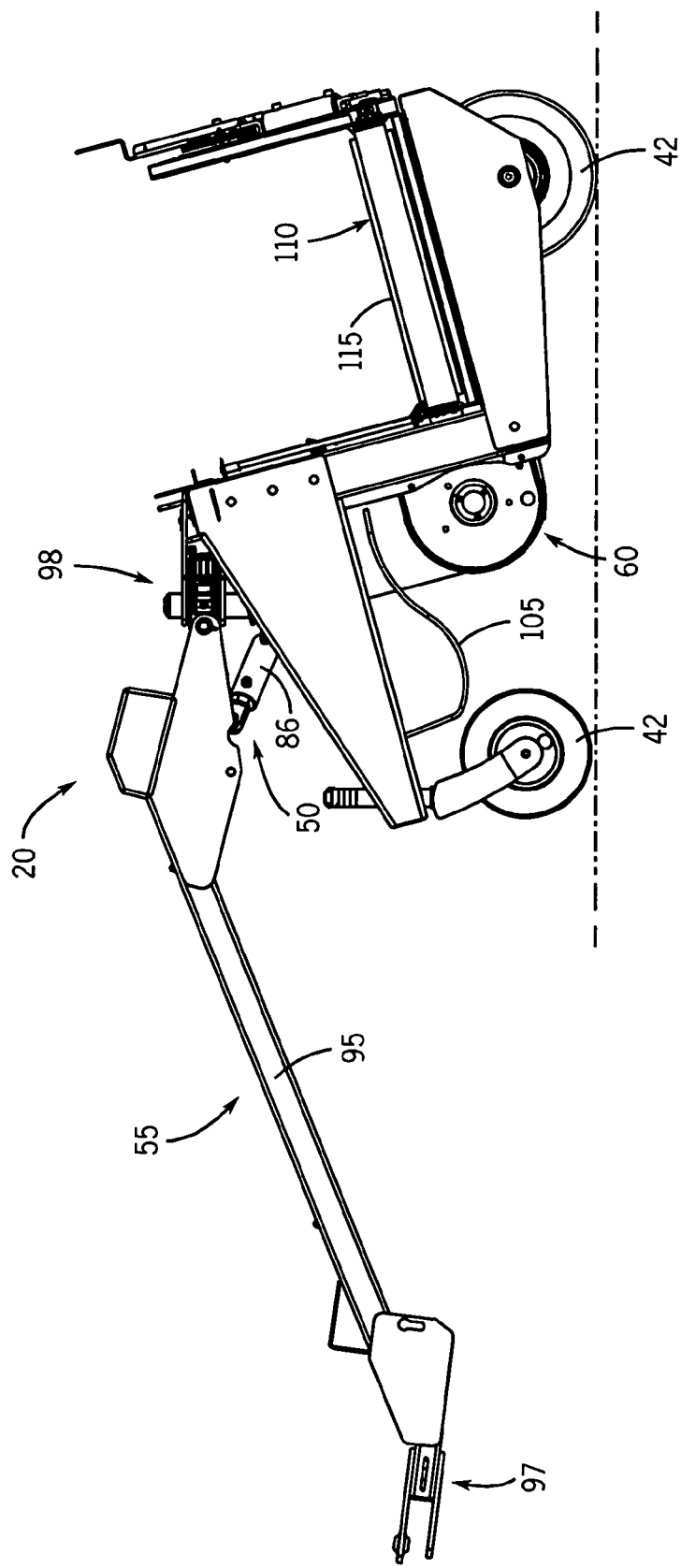
FIG. 7 is a side elevation view showing the windrow merger of FIG. 1 and certain of the functional assemblies of FIG. 2 that are incorporated in the windrow merger.
Figure 12:
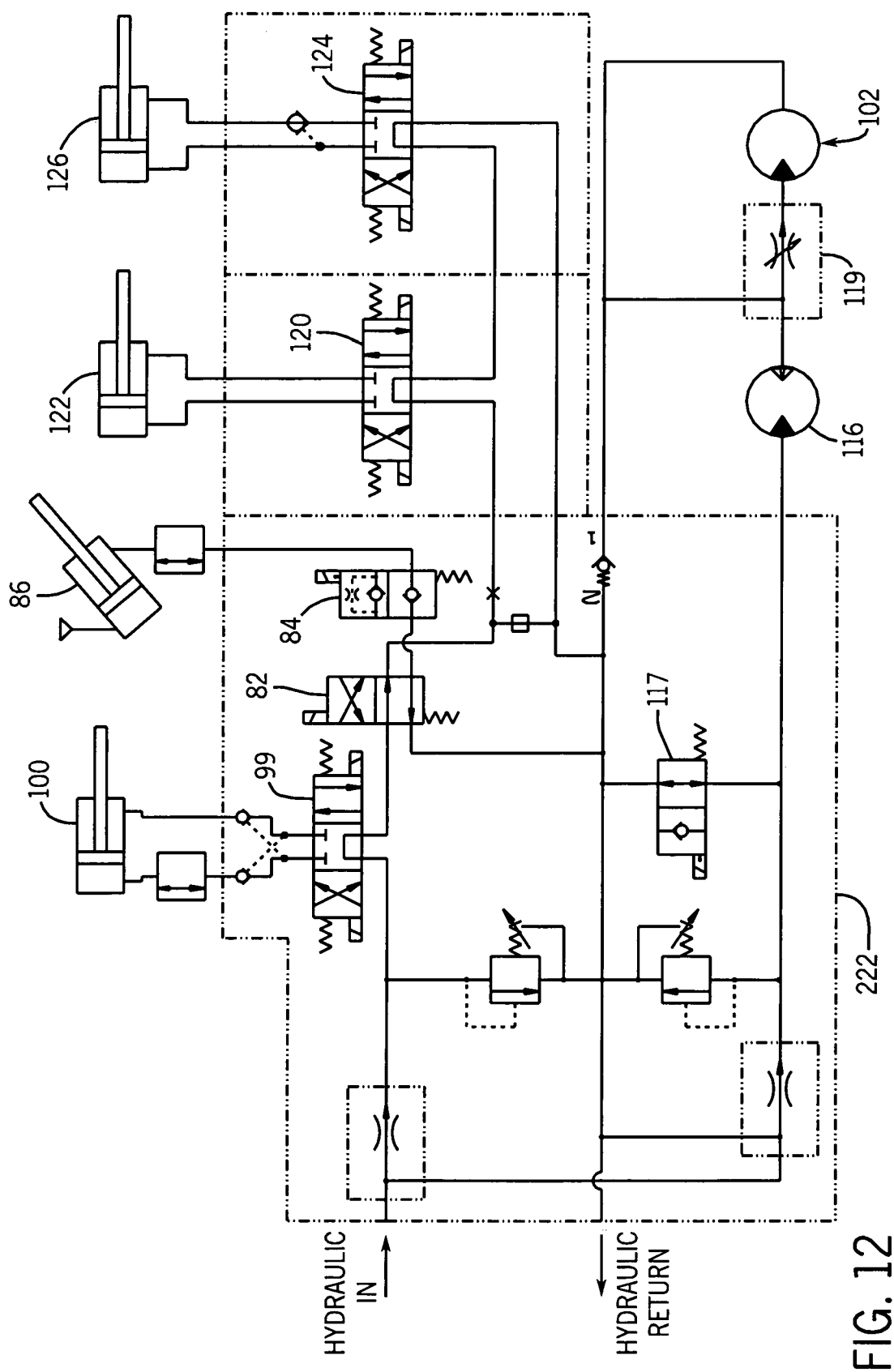
FIG. 12 is a schematic diagram illustrating a hydraulic system of the windrow merger of FIG. 1.
Figure 13:
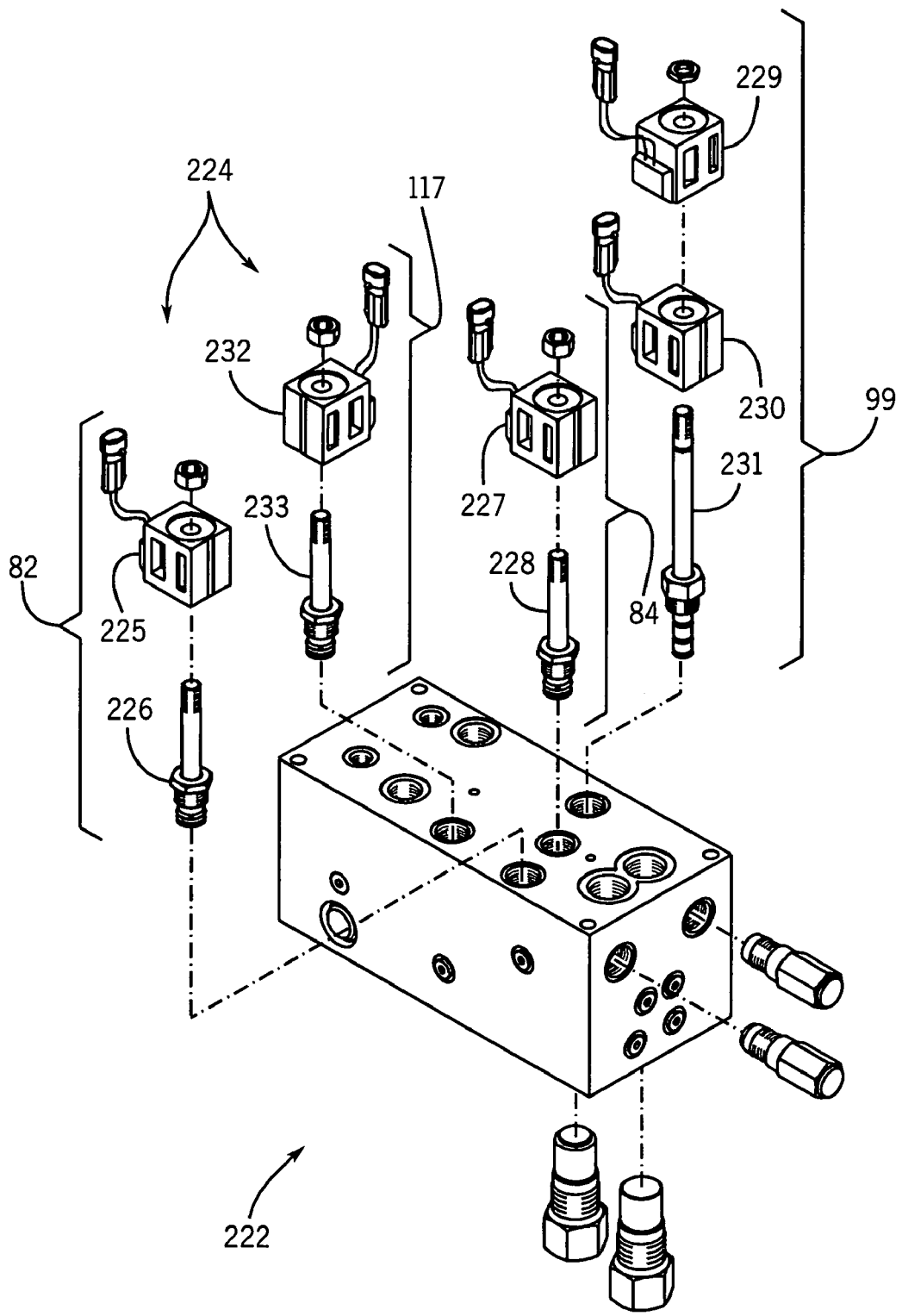
FIG. 13 is an exploded isometric view illustrating a manifold block forming a part of the hydraulic system of FIG. 10.

Referring to FIGS. 2, 7 and 12, the lift assembly 50 is configured to raise and lower the windrow merger 20, according to desired operating parameters of windrow merger 20. Lift assembly 50 is operated to lower windrow merger 20 relative to the ground for engaging crop material lying on the ground, and for varying the pressure of the tines of the pickup assembly 60 on the ground. Referring to FIG. 12, the preferred lift assembly 50 includes lift control valves 82 and 84 and a hydraulic lift assembly 86, although it is understood that any other type of lift arrangement may be employed, e.g. an electrically operated linear actuator or the like. The lift assembly 50 also allows the operator to raise the windrow merger 20 for transport (e.g., on a highway or otherwise when not in use).

The tow assembly 55 includes a tongue or tow member 95 having a first end 97 configured to couple with the tow vehicle, in a manner as is known. The tow member 95 includes a second end 98 that is connected to the frame 40. The tow assembly 55 further includes a tow control valve 99 (FIG. 12) and a tow drive 100. A preferred tow drive 100 is a hydraulic cylinder configured to relocate or swing the first end 97 of the tow assembly 55 to and from a centered position. Operation of the tow drive 100 to swing the tow assembly 55 causes the windrow merger 20 to variably swing toward a left or right position, or in or out, relative to the tow vehicle, in order to control the position of the windrow merger 20 on the ground as the tow vehicle moves through a field. The tow control valve 99 regulates the position of the tow drive 100. A preferred tow control valve is a solenoid valve, such as a cartridge valve, but the type of tow control valve can vary.

The pickup assembly 60 is configured to collect or rake the crop material from the ground, in a manner as is known. A preferred pickup assembly 60 includes a shaft having a number of tines that extend radially outward from the shaft. The shaft of the pickup assembly 60 is rotatably driven by a pickup drive 102 (FIG. 12), which may be in the form of a hydraulic motor, to rake or pick up crop material lying the ground. The pickup assembly 60 also includes a windguard 105 (FIGS. 1, 7), which is configured to hold the collected crop material to the pickup assembly 60.

Referring to FIGS. 1, 2 and 7, windrow merger 20 further includes a conveyor assembly 110 disposed on the rear portion 30 and configured to receive the collected crop material from the pickup assembly 60. The conveyor assembly 110 includes a conveyor belt 115 that is interconnected with the conveyor drive assembly 65, such that operation of conveyor drive assembly 65 functions to drive rotation of conveyor belt 115. The conveyor drive assembly 65 is preferably in the form of a hydraulically operated motor 116 and a drive control valve 117 (FIG. 12) configured to regulate hydraulic flow to the hydraulic motor 116. The hydraulic motor 116 is operable to provide either clockwise or counterclockwise operation, to move the conveyor belt 115 in either a first lateral direction toward one of side portions 32, 34 or in a second lateral direction toward the other of side portions 32, 34. A preferred conveyor assembly is an endless belt platform-type conveyor assembly disposed rearwardly of the pickup assembly 60. While conveyor drive assembly 65 is disclosed as being a hydraulic motor, it is understood that any other type of drive arrangement may be employed. The operation of the conveyor belt 115 directs the discharge of the collected crop material toward either side portion 32 or 34 relative to the windrow merger 20. Conveyor belt 115 includes cleats 118 that are operable to provide positive engagement with the crop material on conveyor belt 115 in order to transport the crop material to the desired side portion of windrow merger 20.

In a first mode of operation, the conveyor drive assembly 65 is operated in a first direction of rotation, so as to drive the conveyor belt 115 in a first lateral direction such that the crop material is directed toward the side portion 32 of the merger 20. In a second mode of operation, the conveyor drive assembly 65 is operated in a second direction of rotation, so as to drive the conveyor belt in a second lateral direction toward the side portion 34 of the merger 20. In a stationary mode, the conveyor drive assembly 65 is held in neutral, causing the collected crop material to accumulate on the conveyor belt 115. As the merger 20 continues to accumulate the crop material, the operator can selectively operate the conveyor drive assembly 65 to discharge a desired amount of crop material in either the first or second lateral direction at a desired location.

The speed control assembly 70 is operable to vary the speed of the pickup assembly 65 and the conveyor assembly 110. A preferred speed control assembly 70 includes a speed control valve 119 (FIG. 12) configured to vary the speed of the pick up assembly 60 and the conveyor drive assembly 65, which may be in the form of a hydraulic motor, but other types of variable speed drives can be used. In the illustrated embodiment, the speed control valve 119 regulates the hydraulic output, thereby varying the speed of the pickup drive 102 and the conveyor drive 116. The speed of the pickup assembly 60 and the conveyor belt 115 decreases with reduction in hydraulic output from the tow vehicle, in a manner as is known. The type of speed control valve 119 (e.g., flow limiter) can vary.

Figure 9:
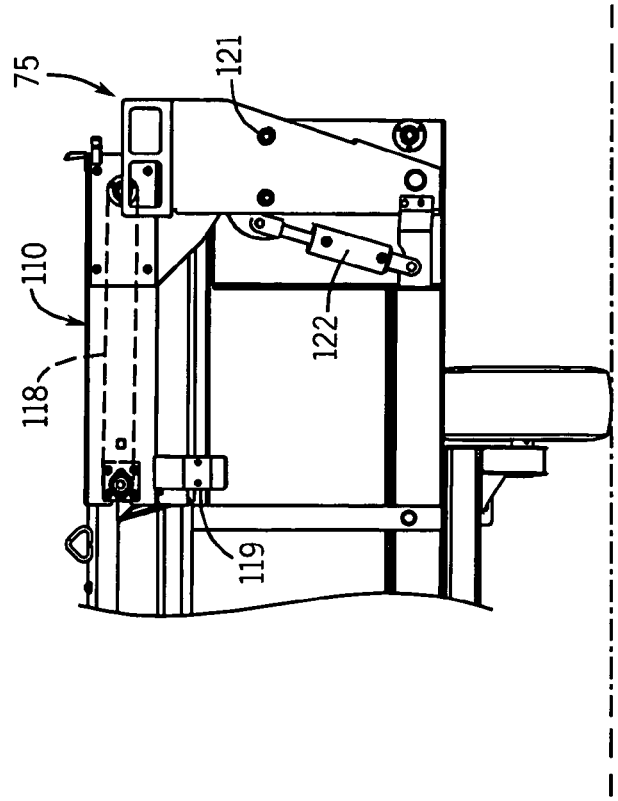
FIG. 9 is a partial elevation view similar to FIG. 8, showing the optional extension conveyor assembly in a raised position.
Figure 8:
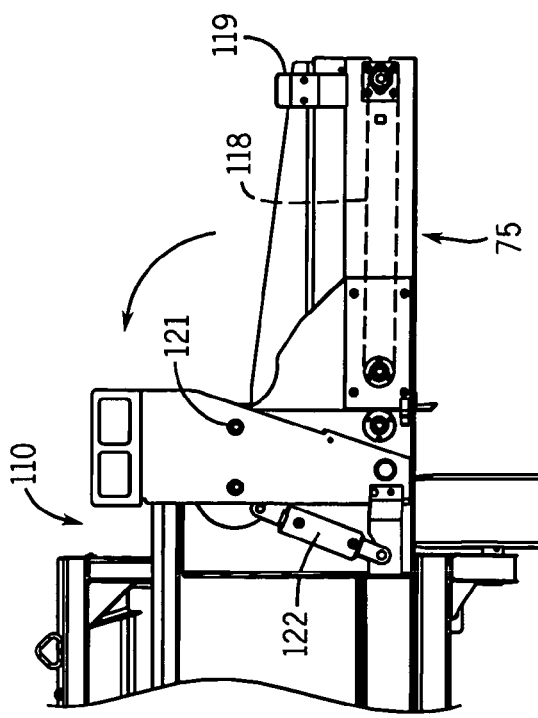
FIG. 8 is a partial elevation view showing an end portion of the windrow merger of FIG. 1 and an optional extension conveyor assembly of FIG. 2 with the extension conveyor assembly in a lowered position.

Referring to FIGS. 2, 8, 9, and 12, the extension conveyor assembly 75 can be coupled to one or the other of the discharge ends of the conveyor assembly 110 described above. Referring to FIGS. 8 and 9, the extension conveyor assembly 75 includes an extension conveyor belt 118 driven by an extension conveyor drive 119, which is operable to extend the effective lateral conveying distance that is available for directing the discharge of collected crop material from the merger 20. The extension assembly 75 further includes an extension control valve 120 (FIG. 12) and an extension lift assembly 122 (e.g., a hydraulic cylinder) configured to move the extension conveyor assembly 75 between a raised, inoperative position (See FIG. 9) and a lowered, operative position (See FIG. 8). In the lowered positioned, the upper run of the conveyor belt 118 of extension conveyor assembly 75 is in line with the upper run of conveyor belt 115 of conveyor assembly 110, such that crop material discharged from an end of conveyor belt 115 moves onto the upper run of the conveyor belt 118 of extension conveyor assembly 75. Operation of extension conveyor assembly 75 then moves the crop material laterally to the discharge end of extension conveyor assembly 75, which functions to increase the offset or discharge distance that is available to laterally move a windrow supplied to conveyor assembly 110 from pickup assembly 60. To stow the extension conveyor assembly 75, the extension control valve 120 is actuated so as to cause movement of the extension lift assembly 122 to an extended position, e.g. by outward movement of the rod end of the hydraulic lift assembly 122, which causes extension conveyor assembly 75 to pivot upwardly about a pivot connection shown at 121. In this manner, the extension conveyor assembly 75 is moved to the inoperative raised position, in which the upstream end of the conveyor belt of extension conveyor assembly 75 is moved out of alignment with the discharge of conveyor belt 115 of conveyor assembly 110 and the entirety of extension conveyor assembly 110 is moved positioned vertically above conveyor belt 115 of conveyor assembly 110. Movement of extension conveyor assembly 75 to the inoperative position in this manner functions to reduce the effective width of the merger 20, in that crop material discharged from the downstream end of conveyor assembly 110 is deposited directly onto the ground.

Figure 10:
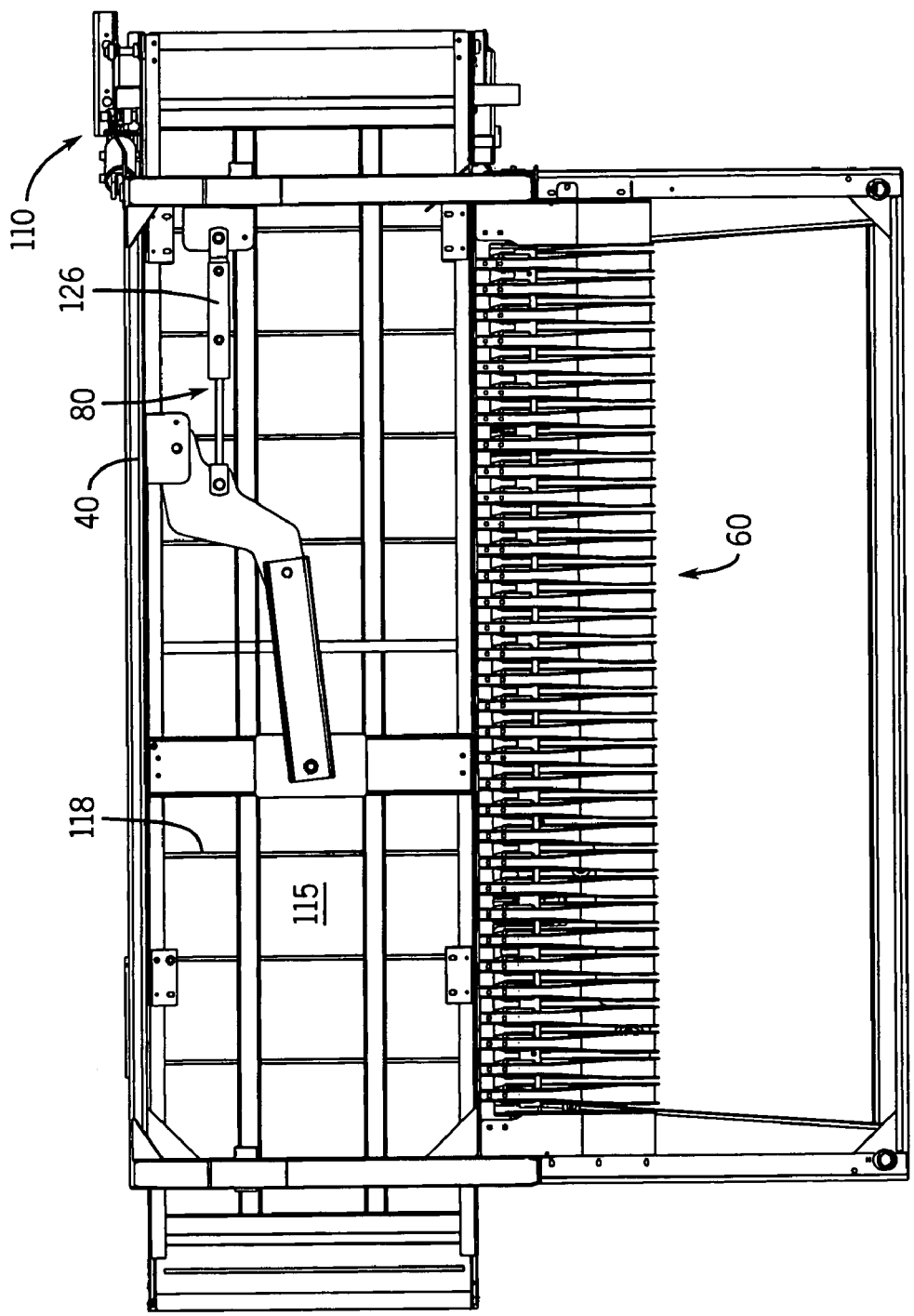
FIG. 10 is a partial plan view of the windrow merger of FIG. 1 showing an optional bed shift assembly of FIG. 2 in an inward position.
Figure 11:
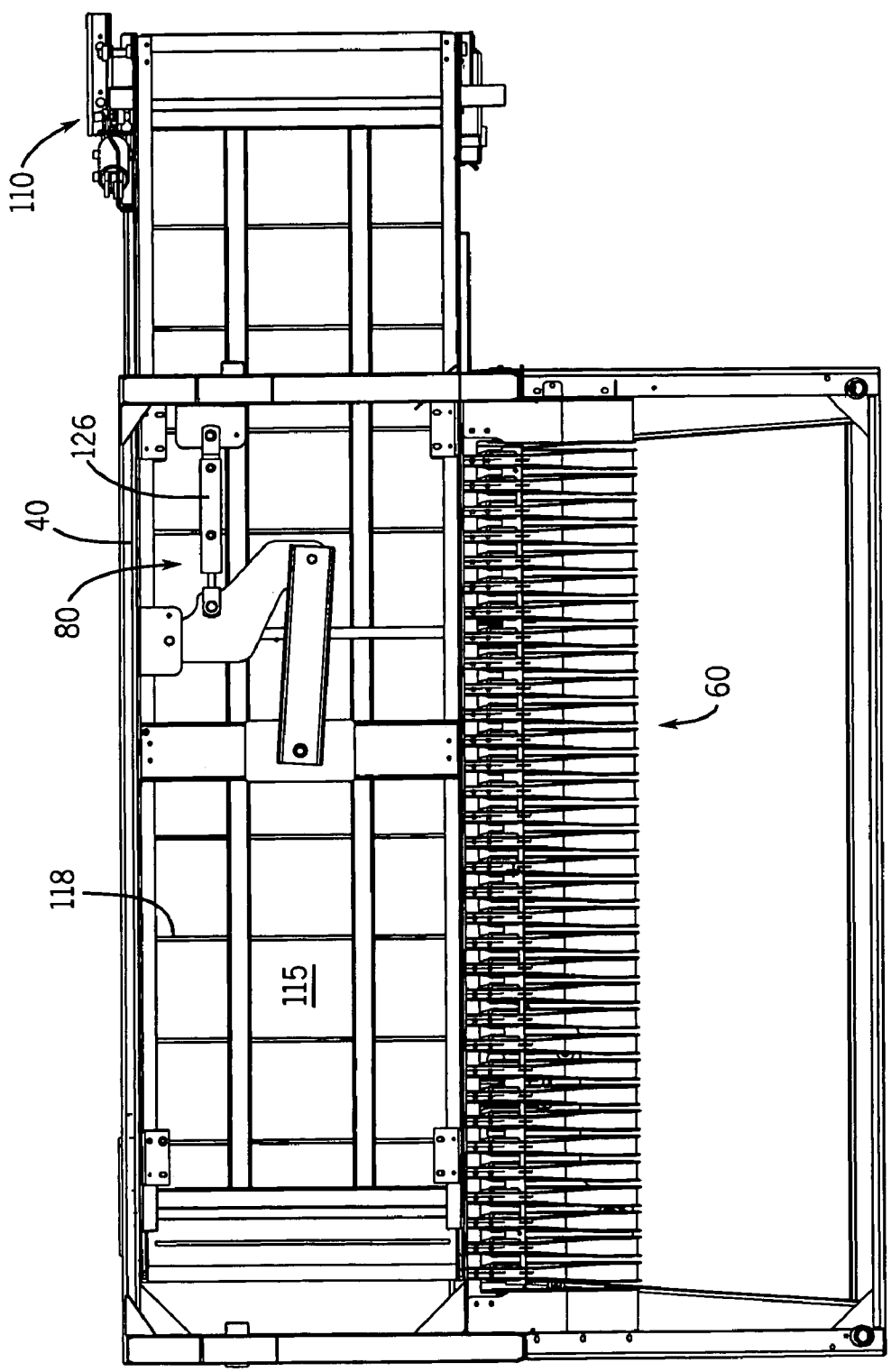
FIG. 11 is a partial plan view similar to FIG. 10, showing the optional bed shift assembly of FIG. 10 in an outward position.

Referring to FIGS. 2, 10, and 11, the optional bed shift assembly 80 is configured to move the frame or bed of the conveyor assembly 110 laterally, for varying the location of the discharge end of the conveyor assembly 110. A preferred bed shift assembly 80 includes a control valve 124 and a hydraulic cylinder assembly 126 interconnected between frame 40 and the frame of conveyor assembly 110, which is configured such that extension and retraction of the cylinder assembly 126 is operable to move the discharge location of the conveyor belt 115 relative to side portions 32 and 34 of the merger 20.

Figure 3:
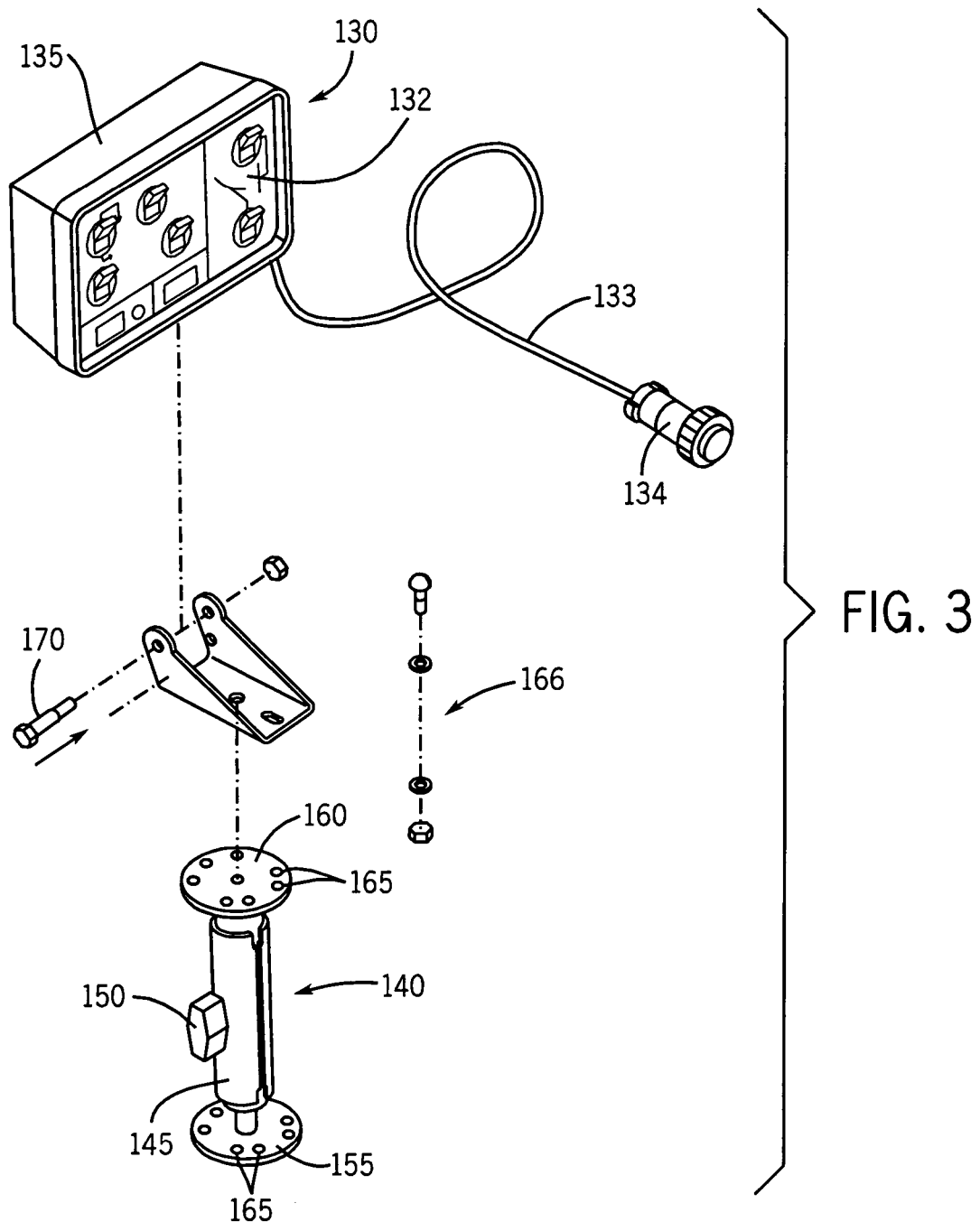
FIG. 3 is an exploded isometric view showing an embodiment of the controller of FIG. 2 and a mounting assembly for mounting the controller at a location remote from the windrow merger, such as in the cab of a tow vehicle such as a tractor.

Referring to FIGS. 2 and 3, the control arrangement 48 is configured with a controller 130 to regulate operation of the above described functional systems or assemblies of the merger 20 from a remote location relative to the merger 20. The controller 130 includes a control panel 132 and a communication bus or line 133 having a connection plug 134 configured to communicate operator input and output commands with the functional systems or assemblies of merger 20.

Referring to FIG. 3, the controller 130 includes a housing 135. A preferred remote location for the housing 135 and the controller 130 is within the vicinity or operating range of the operator of the tow vehicle, e.g., in the cabin of a tractor, although it is understood that the location of the housing 135 and controller 130 can vary. Housing 135 is configured to be secured to a bracket assembly 136, which functions to couple the housing 135 to a pedestal 140 that can be mounted in any satisfactory location in the operator's cabin of the tow vehicle. The pedestal 140 includes a swivel mount 145 that can be locked in position with actuation of swivel lock 150, which enables an operator to maintain housing 128 in a desired position. The lower end 155 of the pedestal 140 can be coupled to a fixed support structure of the tow vehicle, e.g. the vehicle dashboard or the like. The upper end 160 of the pedestal 140 receives the bracket assembly 135. The upper end 160 of the pedestal 140 include a series of openings 165 that allows the controller 130 to be mounted on the pedestal 140 in a number of different angular positions, and maintained in the desired position using a nut and bolt assembly 166 that extends through an opening in mounting bracket 135 and an aligned opening 165 in pedestal upper end 160. Similarly, the lower end 155 of the pedestal 140 includes a series of openings 165, which enable the pedestal 140 to be mounted on the support structure of the tow vehicle in a variety of positions as desired. In this manner, the operator is able to position controller housing 128 so as to provide optimal viewing and accessibility of controller 130. The bracket assembly 135 includes a pin 170 coupling the bracket assembly 135 to the controller 130, which provides additional adjustability in the position of the controller 130. It is understood that the particular composition and details of assembly of the housing 128, the mounting bracket 135, and the pedestal 140 can vary from the particular construction as shown and described.

Figure 4:
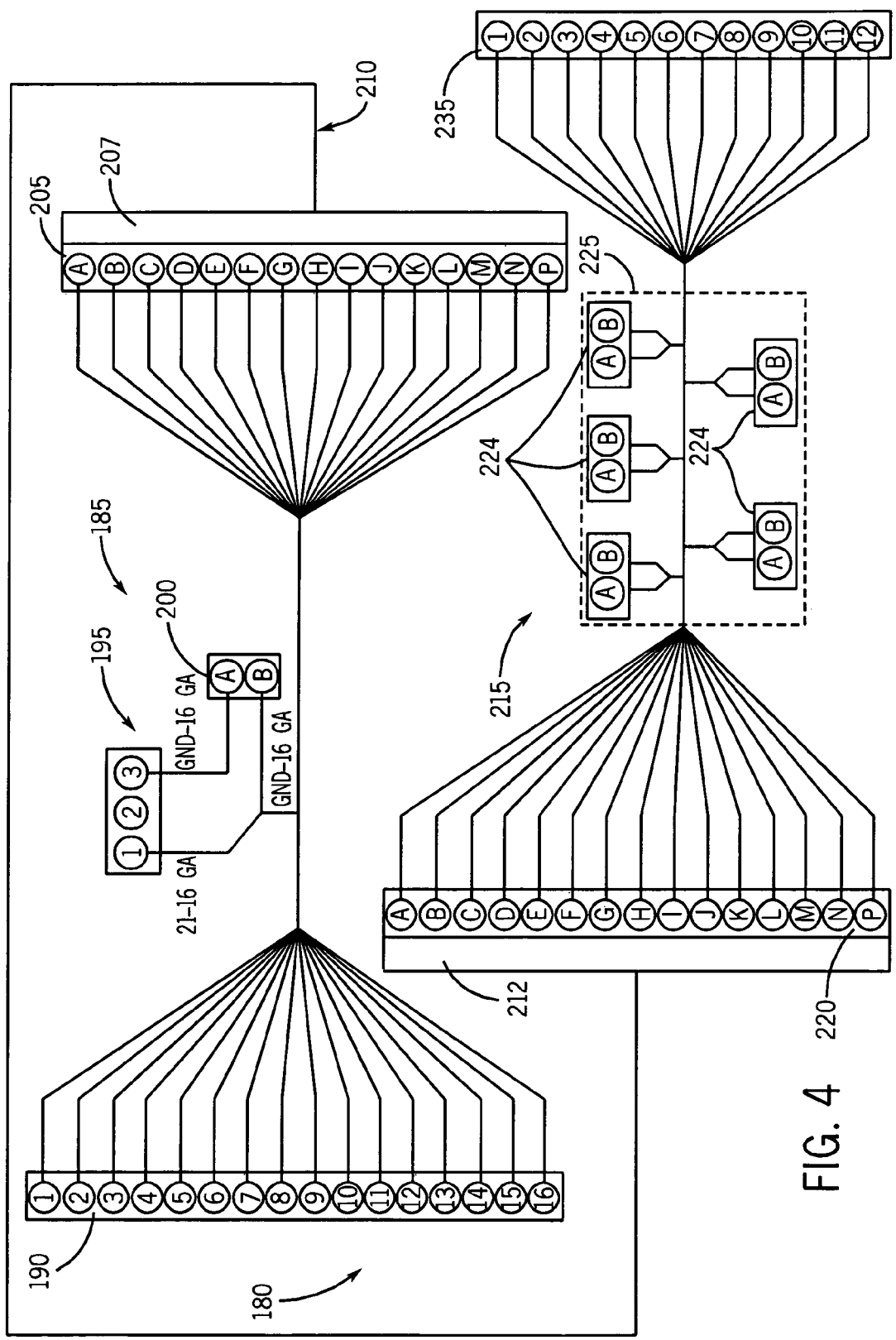
FIG. 4 is a wiring diagram showing interconnection of the controller with the functional systems and assemblies of the windrow merger as in FIG. 2.
Figure 5:
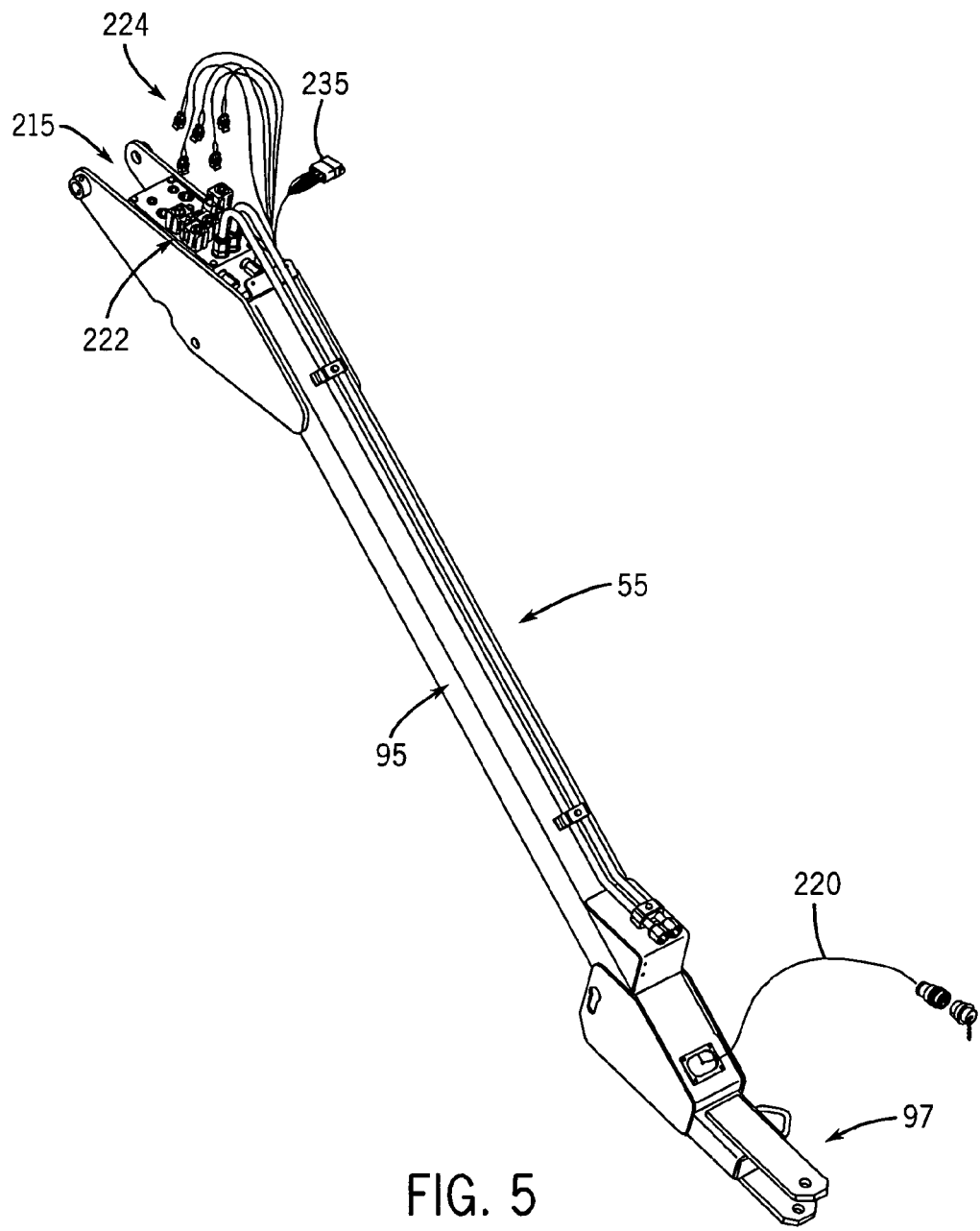
FIG. 5 is an isometric view illustrating a pull tongue forming a part of the windrow merger of FIG. 1, and the manner in which the wiring shown in FIG. 4 is interconnected with the pull tongue for routing the wiring between the towing vehicle and the windrow merger.

FIGS. 4 and 5 illustrate the manner in which controller 130 is interconnected with the various functional systems or assemblies of windrow merger 20 described previously. Referring to FIG. 4, the controller 130 is in communication with the functional systems or assemblies via a harness assembly 180. One embodiment of the harness assembly 180 includes a series of electrical connections configured to allow the controller 130 to connect to a power supply (not shown) and with the various functional systems or assemblies incorporated into the merger 20. The power supply provides the electrical power via the harness assembly 180 to power the control arrangement 48. The power supply is preferably a 10.5 to 12 volt direct current (DC) power supply of the tow vehicle, but the type and source of the power supply can vary.

A preferred embodiment of the harness assembly 180 includes a first harness 185 having a first plug 190 configured to receive a connection plug 134 from the controller 130, and a second plug 195 configured to connect to the tow vehicle power supply, such as a convenience outlet of a tractor. The second plug 195 includes a fuse 200 (e.g., 7.5 A) to provide short protection for the control arrangement 48. Alternatively, the harness assembly 180 can be configured to connect to the battery power supply of the tow vehicle. The type of plugs and harnesses can vary. The plugs can include any female adapter and/or male adapter known for use with electrical harnesses or communication buses. In a preferred form, the first harness 185 is located on the tow vehicle such as the tractor.

The first harness 185 also includes a third plug 205 configured to electrically couple with a first plug 207 of a second harness 210, which extends between the tow vehicle 20 and the windrow merger 20. The second harness 210 includes a second plug 212 leading to the windrow merger 20.

Referring to FIGS. 4 and 5, a manifold assembly 215 communicates control signals from the controller 130 via the first harness 185 and the second harness 210 to the respective functional systems or assemblies on the merger 20. The second plug 212 of second harness 210 is connected to a first plug 220 at front end 97 of tow member 55. Plug 212 is coupled to a series of wires that extend throughout the length of tow member 55, which in turn terminate in connections 224 located adjacent manifold assembly 215, which is secured to rear end 98 of tow member 55. The manifold assembly 215 further includes a manifold block 222 having a series of control valves configured to receive the series of electrical connections 224 from the plug 220. The control valves are operable to control actuation of the one or more functional assemblies of the merger 20 based on control signals from the controller 130 via the harness assembly. The controller 130 provides control signals via the harness assembly 180 to the respective control valves associated with each respective functional assembly. One embodiment of the manifold block includes valves 82, 84, 99 and 117. The valves 82, 84, 99 and 117 are preferably solenoid valves configured to regulate or control the hydraulic output to the respective functional assembly. Control valve 82 includes solenoid 225 coupled to valve 226. Control valve 84 includes solenoid 227 coupled to valve 228. Control valve 99 includes stacked solenoids 229 and 230 coupled to valve 231. Control valve 117 includes solenoid 232 coupled to valve 233.

The first plug 220 is also interconnected with a second plug 235 that is operable to electrically connect with a respective one or more control valves configured to control operation of optional extension assembly 75 and/or bed shift assembly 80, or other known functional assemblies. Thereby, the control arrangement 48 of the present invention provides ready attachment of optional functional assemblies to the controller 130.

Figure 6:
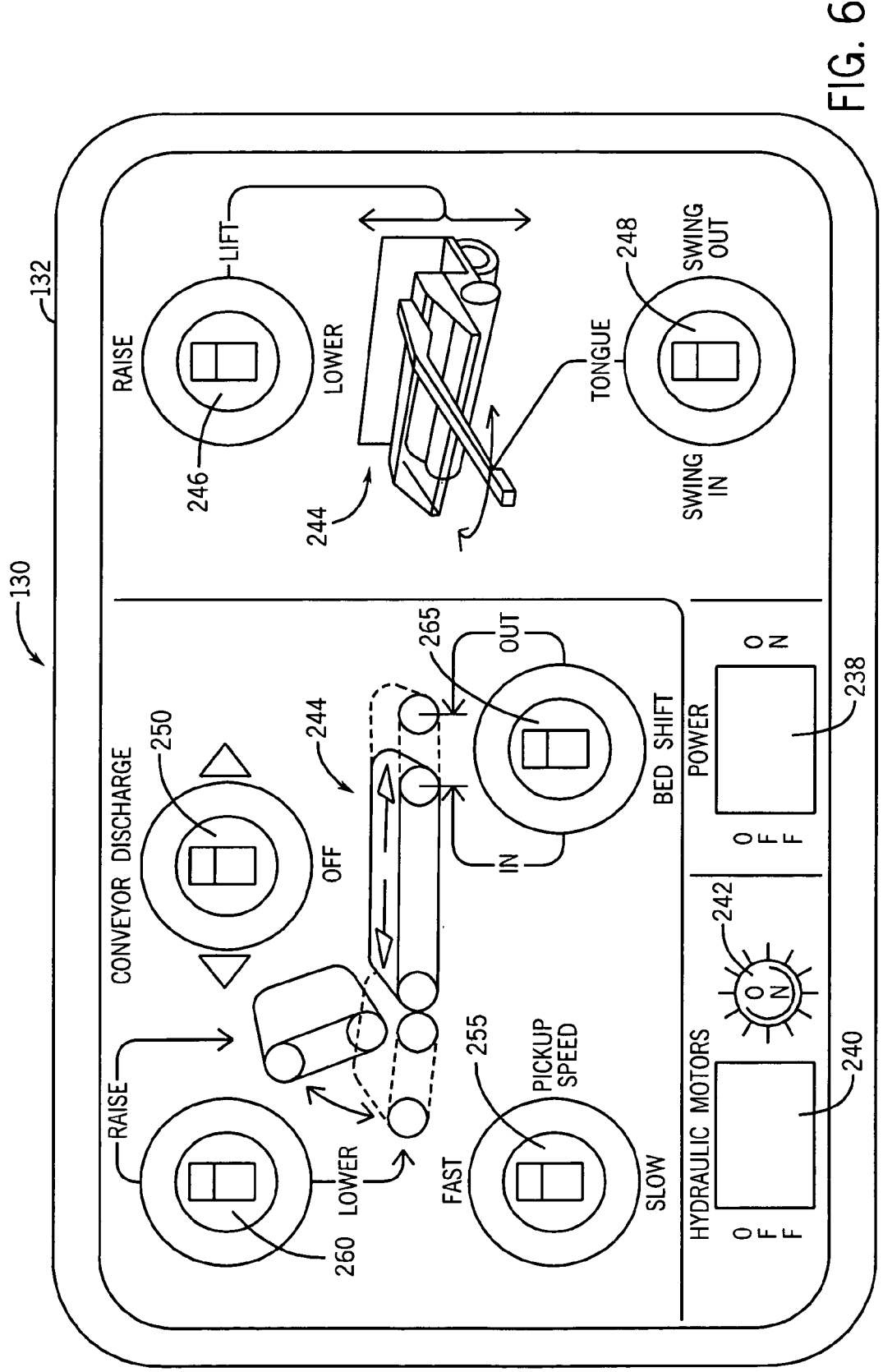
FIG. 6 is a detailed elevation view of an illustrative configuration of a screen of the controller shown in FIG. 3.

Referring to FIG. 6, a preferred embodiment of the control panel 132 includes a main ON/OFF switch 238, a hydraulic motor activation switch 240, and a series of input selector switches and outputs configured to regulate operation of the one or more functional assemblies incorporated on the merger 20. The main ON/OFF switch 238 allows electrical power from the power supply of the tow vehicle to activate the controller 130. The main ON/OFF switch 238 is operable to illuminate in the ON position to indicate operation of the controller 130.

The hydraulic motor activation switch 240 is operable to activate operation of the hydraulic motors associated with the respective pickup assembly 60 and the conveyor drive assembly 65. An indicator light 242 illuminates when the hydraulic motor activation switch 235 is the ON position.

The series of input selector switches correspond to the above described functional assemblies of the merger 20. The actuation of each input switch is configured to correspond to an operation or movement of the respective functional assembly. The number or type of switches can vary.

The control panel 132 also includes a series of graphic displays and/or annotations 244 associated with the operation of the input switches. Each graphic display 244 generally describes the function and the actuation of corresponding functional assembly that corresponds with movement of a respective input switch. The type of graphical displays 244 (e.g., drawn, etched, illumination, etc.) can vary. The control panel 132 can also include a display (e.g., liquid crystal display, indicator lights, etc.) operable to indicate operational data of the number of the functional assemblies of the merger 20 to the operator.

Still referring to FIG. 6, one embodiment of the input switches includes a lift switch 246 that is operable to control operation of the lift assembly 50 and respective hydraulic lift member 86 in raising or lowering the merger 20, as described above. The lift switch 246 has a RAISED position and a LOWERED position. Upon release of the lift switch 246 from the RAISED position, the lift switch 246 is also operable to automatically retract toward a neutral position. Upon release in the LOWERED position, the lift switch 246 does not retract and maintains the merger in the lowered position for merging crop material.

A tongue switch 248 is operable to control movement of the tow assembly 55. Toggling the tongue switch 245 toward a SWING IN position causes the tow assembly 55 to swing the first end 97 of the tow arm and causes the merger 20 to swing in toward the tow vehicle. Toggling the switch 248 toward a SWING OUT position causes the tow assembly 55 and respective tow drive 100 to swing the tow member 95 such that the merger 20 swings out or away relative to the tow vehicle.

A conveyor discharge switch 250 is operable to control the discharge direction of the conveyor drive assembly 65. Toggling the conveyor discharge switch 250 toward a left or right arrow position causes the corresponding conveyor drive assembly 65 to discharge collected crop material toward the respective left or right of the merger. In the central or neutral position, the conveyor drive assembly 65 is held in neutral such that collected crop material accumulates on the bed of the conveyor belt 115. This aspect of the control arrangement 48 enables an operator to accumulate a desired quantity of crop material and discharge the crop material at a desired location.

A pickup speed switch 255 is operable to control the speed of the pickup assembly 60 and the conveyor speed control 70 based on crop conditions. Toggling the speed switch between the FAST or SLOW positions causes the speed of the pickup assembly 60 and conveyor speed control assembly 70 to increase or lower, respectively. Upon release, the pickup speed switch 255 automatically retracts toward a neutral position.

An extension switch 260 is operable to control the position of the extension conveyor assembly 75. Toggling the extension switch 260 toward a RAISE or LOWER position causes the extension conveyor assembly 75 and respective extension lift assembly 126 to raise (See FIG. 9) or lower (See FIG. 8) the discharge end of the extension assembly 75, respectively.

A bed shift switch 265 is operable to control movement of the conveyor assembly 110. Toggling the bed shift switch 265 toward an IN position causes the conveyor assembly 110 and respective hydraulic cylinder assembly 126 to retract conveyor assembly 110 inward with respect to the discharge end of the merger 20 (See FIG. 10), while toggling the bed shift switch 265 toward an OUT position causes the bed shift assembly 80 to move the conveyor assembly 110 outward with respect to the discharge end of the merger 20 (See FIG. 11.

One or more of the input switches can be associated with optional functional assemblies. If an optional functional assembly is not incorporated on the merger 20, then the respective input switch remains inactive.

In operation, the housing 135 and controller 130 are mounted in the vicinity and handling range of the operator of the tow vehicle. The control arrangement 48 allows the operator to remotely control operation of the various functional assemblies of the merger 20 without leaving the tow vehicle. The control arrangement 48 also simplifies the operator's control of the multiple functional assemblies incorporated in the merger 20. The operator toggles the main switch to the ON position to activate the control arrangement 48. The operator then toggles the hydraulic motor activation switch 240 toward the ON position to close control valve 117 and activate the hydraulic motors 102 and 116 of the pickup 60 and conveyor 110 assemblies, respectively. To shutdown the merger 20, the operator returns all the input switches to their neutral position. The operator toggles the hydraulic motor activation switch 235 toward the OFF position to open control valve 117 and stop the conveyor 110 and the pickup 60 assemblies. To deactivate the control arrangement 48, the operator moves the main power switch 240 to the OFF position. Thereafter, the operator can disengage the connections of the hydraulic flow to and from the hydraulic power supply of the tow vehicle.

The above described windrow merger 20 relies on hydraulic power to drive operation of the multiple functional assemblies of the windrow merger. Alternatively, the windrow merger can include mechanical and/or electrical driven functional assemblies configured to be remotely controlled by the controller. In another alternative, the windrow merger can integrated with the hydraulic power system of the tow vehicle, and the controller can be disposed within ready access of the operator of the merger 20.

With this construction, the provision of a common control box in the cab of the tow vehicle provides complete control of all components of merger 20 by selecting the appropriate switch of controller 130. The operator can remain in the tractor to make all routine adjustments in operation of merger 20. The graphics of the controller 130 are configured to be user friendly, so that an operator can quickly and easily determine the function that is controlled by each switch. All switches move in a direction that corresponds to the function being controlled, to provide additional ease of use.

Various alternatives and embodiments are contemplated as being within the scope of the following claims particularly pointing out and distinctly claiming the subject matter regarded as the invention.

What is claimed is:

1. A control arrangement for a pull-type windrow merger adapted to be pulled along the ground by a tow vehicle having an electrical power supply, the pull-type windrow merger having a plurality of actuable functional assemblies configured to interact and cooperate to selectively collect crop material from a first location on the ground, move the crop material laterally, and discharge the crop material in a second location on the ground, as the windrow merger is moved along the ground by the tow vehicle, the control assembly comprising;
    a housing;
    a controller disposed in the housing, wherein the controller includes a plurality of inputs, and wherein each of the controller inputs corresponds to one of the functional assemblies of the windrow merger; and
    a harness arrangement configured to electrically connect the controller to the plurality of functional assemblies and to a power supply, wherein the harness arrangement includes:
        a first harness on the tow vehicle having a first connector configured to electrically connect to the controller, a second connector configured to electrically connect the controller to the power supply, and a third connector configured to electrically connect to the plurality of functional assemblies on the pull-type windrow merger; and
        a second harness on the windrow merger configured to connect to the third connector of the first harness to communicate control signals from the controller to the functional assemblies of the windrow merger; and
    wherein the controller and the housing are remotely disposed relative to the pull-type windrow merger, wherein the controller is interconnected through the first and second harnesses with each of the functional assemblies of the windrow merger, and wherein each controller input is interconnected with and controls operation of a single one of the functional assemblies of the windrow merger.

2. The control arrangement of claim 1, further including:
    a hydraulic manifold disposed on the merger, the hydraulic manifold having one or more solenoid valves configured to drive operation of the one or more functional assemblies, wherein the first and second harnesses communicate control signals from the controller to the one or more solenoid valves.

3. The control arrangement of claim 2, wherein the second harness includes an additional connector configured to communicate control signals from the controller to a second hydraulic manifold having one or more solenoid valves.

4. The control arrangement of claim 1, wherein the controller includes a main switch configured to activate the control arrangement.

5. The control arrangement of claim 1, wherein the controller and housing are disposed on the tow vehicle.

6. The control arrangement of claim 1, wherein the housing includes a graphic visual display, and wherein the plurality of inputs of the controller each comprises a graphic representation on the visual display that corresponds to one of the functional assemblies of the windrow merger.

7. A windrow merger adapted to be pulled along the ground by a tow vehicle, comprising:
    a frame;
    a wheel assembly configured to movably support the frame above the ground;
    a plurality of functional assemblies supported by the frame, wherein the functional assemblies are configured to selectively collect crop material from a first location on the ground, move the crop material laterally, and discharge the crop material onto a second location on the ground, as the windrow merger is pulled along the ground by the tow vehicle;
    a hydraulic manifold disposed on the merger, the hydraulic manifold having a plurality of control valves, each of which is configured to drive operation of one of the functional assemblies; and
    a control arrangement having a controller mounted on the tow vehicle, wherein the controller includes a plurality of inputs, and wherein each input is connected through one of the control valves and the manifold to one of the functional assemblies to control operation of the functional assembly.

8. The windrow merger of claim 7, wherein the control arrangement further includes:
    a harness arrangement configured to electrically connect the controller to the plurality of functional assemblies, wherein the harness arrangement includes a first harness section on the tow vehicle that connects the controller to an electrical power supply on the tow vehicle; and a second harness section on the windrow merger that connects to the first harness section and to the a plurality of solenoid valves to drive operation of the functional assemblies.

9. The windrow merger of claim 8, wherein one of the functional assemblies comprises a lift assembly configured to raise or lower the windrow merger relative to the ground.

10. The windrow merger of claim 8, wherein one of the functional assemblies comprises a tow assembly having a tow arm configured to move the windrow merger inwardly or outwardly with respect to the tow vehicle.

11. The windrow merger of claim 8, wherein one of the functional assemblies comprises a conveyor assembly including:
    a conveyor belt; and
    a conveyor drive assembly, wherein the conveyor drive assembly is configured to direct movement of the conveyor belt to selectively discharge the collected crop material in either a leftward lateral direction or a rightward lateral direction onto the second location on the ground.

12. The windrow merger of claim 8, wherein one of the functional assemblies comprises a speed control assembly configured to vary an operating speed of the merger.

13. The windrow merger of claim 8, wherein the windrow merger includes a conveyor having a conveyor belt for moving the crop material laterally, and wherein one of the functional assemblies comprises a bed shift assembly configured to selectively change the lateral position of the conveyor belt relative to the merger.

14. The windrow merger of claim 8, wherein the windrow merger includes a conveyor having a conveyor belt for moving the crop material laterally, and wherein one of the functional assemblies includes an extension assembly including:
    an extension conveyor having a discharge end; and
    an extension lift assembly configured to raise or lower the extension conveyor relative to the conveyor belt of the windrow merger between an inoperative position and an operative position, wherein the extension conveyor in the operative position cooperates with the conveyor belt to position the second location, at which crop material is discharged from the discharge end of the extension conveyor, outwardly relative to the conveyor belt of the conveyor assembly.

15. The windrow merger of claim 7, wherein the controller includes a visual display, and wherein the plurality of inputs of the controller each comprises a graphic representation on the visual display that corresponds to one of the functional assemblies of the windrow merger.

16. A method of controlling operation of a pull-type windrow merger having a plurality of actuable functional systems and adapted to be towed by a tow vehicle having an operator's cab, comprising the steps of:
    positioning a controller in the cab of the tow vehicle; and
    interconnecting the controller with the functional systems of the windrow merger through a harness arrangement including a first harness section on the tow vehicle that is connected to the controller, and a second harness section on the windrow merger that connects to the first harness section and to a series of electrically operated control members carried on the windrow merger, wherein the series of electrically operated control members control the flow of hydraulic fluid through a manifold carried by the windrow merger;
    wherein the controller includes a plurality of inputs, wherein each input is interconnected with and is operable to control operation of a single one of the functional systems of the windrow merger through the control members.

17. The method of claim 16, wherein the controller includes a graphic visual display, and including the step of actuating each input of the controller through a representation on the graphic visual display that corresponds to one of the functional assemblies of the windrow merger.

* * * * *